(12) United States Patent
Kim et al.

(10) Patent No.: US 11,469,934 B2
(45) Date of Patent: Oct. 11, 2022

(54) HEADER REPETITION IN PACKET-BASED OFDM SYSTEMS

(71) Applicant: AX WIRELESS LLC, Cedar Park, TX (US)

(72) Inventors: Joon Bae Kim, Lexington, MA (US); Marcos C. Tzannes, Petaluma, CA (US)

(73) Assignee: AX WIRELESS LLC, Cedar Park, TX (US)

( * ) Notice: Subject to any disclaimer, the term of this patent is extended or adjusted under 35 U.S.C. 154(b) by 0 days.

(21) Appl. No.: 17/539,814

(22) Filed: Dec. 1, 2021

(65) Prior Publication Data

US 2022/0094581 A1 Mar. 24, 2022

Related U.S. Application Data

(63) Continuation of application No. 17/136,801, filed on Dec. 29, 2020, now Pat. No. 11,212,146, which is a
(Continued)

(51) Int. Cl.
*H04L 27/26* (2006.01)
*H04L 1/08* (2006.01)
(Continued)

(52) U.S. Cl.
CPC ......... *H04L 27/26132* (2021.01); *H04B 1/38* (2013.01); *H04L 1/08* (2013.01); *H04L 27/2601* (2013.01); *H04L 69/22* (2013.01)

(58) Field of Classification Search
CPC .. H04B 1/38; H04B 7/00; H04B 7/155; H04J 1/00; H04J 3/00; H04J 3/24; H04J 11/00;
(Continued)

(56) References Cited

U.S. PATENT DOCUMENTS

| 8,266,488 B2* | 9/2012 | Spencer | ................ H04L 1/1819 |
| | | | 714/748 |
| 2003/0072255 A1* | 4/2003 | Ma | ....................... H04J 11/0069 |
| | | | 370/480 |

(Continued)

*Primary Examiner* — Shawkat M Ali
(74) *Attorney, Agent, or Firm* — Park, Kim & Suh, LLC

(57) ABSTRACT

An OFDM communication system is described that allows different values of D in a single domain where nodes are operating in different portions of frequency bands. For the power-line medium, G.9960 has defined two overlapped baseband bandplans, 50 MHz-PB and 100 MHz-PB. In this exemplary scenario, the level of frequency diversity is different depending on the bandplan, hence providing different header decodibility if D is fixed to 1. If D is fixed to 2, then it increases reliability for the narrowband devices, but may also unnecessarily increase overhead for the wideband devices. An exemplary aspect is therefore directed to techniques to accommodate different repetitions schemes ($D=1, \ldots, D_{MAX}$ and $H=1, \ldots, H_{MAX}$) in a single domain, and still allow devices to communicate with one another where $D_{MAX}$ and $H_{MAX}$ can be larger than 2.

10 Claims, 8 Drawing Sheets

Related U.S. Application Data continuation of application No. 16/780,589, filed on Feb. 3, 2020, now Pat. No. 10,917,272, which is a continuation of application No. 16/394,490, filed on Apr. 25, 2019, now Pat. No. 10,554,459, which is a continuation of application No. 16/125,206, filed on Sep. 7, 2018, now Pat. No. 10,291,449, which is a continuation of application No. 15/958,519, filed on Apr. 20, 2018, now Pat. No. 10,079,707, which is a continuation of application No. 15/476,284, filed on Mar. 31, 2017, now Pat. No. 9,973,361, which is a continuation of application No. 15/350,418, filed on Nov. 14, 2016, now Pat. No. 9,614,566, which is a continuation of application No. 13/376,856, filed as application No. PCT/US2010/046088 on Aug. 20, 2010, now Pat. No. 9,584,262.

(60) Provisional application No. 61/235,909, filed on Aug. 21, 2009.

(51) Int. Cl.
*H04B 1/38* (2015.01)
*H04L 69/22* (2022.01)

(58) Field of Classification Search
CPC ..... H04L 1/00; H04L 1/08; H04L 5/00; H04L 12/26; H04L 12/43; H04L 12/54; H04L 12/56; H04L 12/403; H04L 27/28; H04L 27/2601; H04L 27/2613; H04L 69/22; H04M 1/00; H04W 4/00; H04W 24/00; H04W 52/02; H04W 72/04; H04W 72/12; H04W 74/08
USPC ....... 370/207, 229, 242, 252, 294, 328, 329, 370/330, 336, 338, 356, 389, 449, 474; 375/130, 219, 259, 260, 261, 267, 295, 375/316

See application file for complete search history.

(56) References Cited

U.S. PATENT DOCUMENTS

| | | | |
|---|---|---|---|
| 2005/0180315 A1* | 8/2005 | Chitrapu | H04L 1/0606 370/208 |
| 2010/0158046 A1* | 6/2010 | Pu | H04L 27/2626 370/474 |
| 2010/0329366 A1* | 12/2010 | Wang | H04L 5/0048 375/259 |

* cited by examiner

HEADER REPETITION IN PACKET-BASED OFDM SYSTEMS

RELATED APPLICATION DATA

This application is a continuation of U.S. patent application Ser. No. 17/136,801, filed Dec. 29, 2020, which is a continuation of U.S. patent application Ser. No. 16/780,589, filed Feb. 3, 2020, now U.S. Pat. No. 10,917,272, which is a continuation of U.S. patent application Ser. No. 16/394,490, filed Apr. 25, 2019, now U.S. Pat. No. 10,554,459, which is a continuation of U.S. patent application Ser. No. 16/125,206, filed Sep. 7, 2018, now U.S. Pat. No. 10,291,449, which is a continuation of U.S. patent application Ser. No. 15/958,519, filed Apr. 20, 2018, now U.S. Pat. No. 10,079,707, which is a continuation of U.S. patent application Ser. No. 15/476,284, filed Mar. 31, 2017, now U.S. Pat. No. 9,973,361, which is a continuation of U.S. patent application Ser. No. 15/350,418, filed Nov. 14, 2016 now U.S. Pat. No. 9,614,566, which is a continuation of U.S. patent Ser. No. 13/376,856, filed Feb. 8, 2012, now U.S. Pat. No. 9,584,262, which is a national stage application under 35 U.S.C. 371 of PCT Application No. PCT/US2010/046088 having an international filing date of Aug. 20, 2010, which designated the United States, which PCT application claims the benefit of and priority under 35 U.S.C. § 119(e) to U.S. Patent Application No. 61/235,909, filed Aug. 21, 2009, entitled "Header Repetition Scheme in Packet-Based OFDM Systems," each of which are incorporated herein by reference in their entirety.

FIELD

An exemplary aspect of this invention relates to communications systems. More specifically, exemplary methods, systems, means, protocols and computer-readable storage media, are directed toward header repetition in a communications environment.

BACKGROUND

Conventional multi-user communications system use frame-based (or packet-based) transmission to communication between two or more users over a shared channel based on Orthogonal Frequency Division Multiplexing (OFDM)—(OFDM is also sometimes referred to as multicarrier modulation.) A packet is usually formed by a preamble, header, and payload, and transmitted using time-sharing or contention-based media access methods. An example of such a system includes IEEE 802.11 (Wireless LAN), IEEE 802.16 (WiMAX), and ITU G.9960 (G.hn). These systems use OFDM transmission, which is also sometimes referred to as Discrete Multi-Tone (DMT) which divides the transmission frequency band into multiple subcarriers (also referred to as tones or sub-channels), with each sub-carrier individually modulating a bit or a collection of bits.

The header contains important control information for the receiver to decode the payload properly, and also provides information about the packet length for virtual carrier sensing. Hence, it is essential to decode the header reliably. In G.9960, which is incorporated herein by reference in its entirety, and should be familiar to those skilled in the art, the header containing $PHY_H$ bits (header information block) is carried over one or two OFDM symbols (D=1 or 2), and within each symbol, multiple header information blocks are repeated over the entire frequency band. (See Editor for G.9960, "ITU-T Recommendation G.9960: Next generation wire-line based home networking transceivers—Foundation," ITU-T SG15/04, January 2009) The default value of D is 1, but expanding it to 2 in some cases is under discussion. See, for example, "G.hn: PHY-Frame Header Extension," ITU Temporary Document ITU-T SG-15/Q4 09CC-046, August 2009, and ITU Temporary Document ITU-T SG15/Q4 09XC-100 entitled "G.hn: Using Two Symbols for the Header of PHY Frame on Coax," July, 2009, filed in the priority application and incorporated herein by reference in their entirety.

The possibility of carrying more than $PHY_H$ bits in the header (H=1 or 2) is also under discussion as disclosed in the "G.hn: PHY-Frame Header Extension" article and in "G.hn: Extended PHY Frame Header," ITU-T 5G15/04 09XC-119, July 2009, filed in the priority application and incorporated herein by reference in their entirety.

SUMMARY

One exemplary technique discussed herein is allowing different values of D in a single domain where nodes are operating in different portions of frequency bands. For the power-line medium, G.9960 has defined two overlapped baseband bandplans, 50 MHz-PB and 100 MHz-PB. The possibility of having narrower bandplans such as 25 MHz-PB and 12.5 MHz-PB are under discussion in order to support, for example, SmartGrid applications.

In this exemplary scenario, the level of frequency diversity is different depending on the bandplan, hence providing different header decodability if D is fixed to 1. If D is fixed to 2, then it increases reliability for the narrowband devices, but may also unnecessarily increase overhead for the wideband devices.

An exemplary aspect is therefore directed to techniques to accommodate different repetitions schemes (D=1, . . . , $D_{MAX}$ and H=1, . . . , $H_{MAX}$) in a single domain, and still allow devices to communicate with one another. $D_{MAX}$ and $H_{MAX}$ can be 2 or larger than 2.

As illustrated in FIG. 1, various header repetition schemes are illustrated where D, H=1 or 2. In FIG. 1, the second instance of a block with the same label is a copy of the prior block. The modulation of the copied block may not be exactly the same as the original version. For example, the label "Header Ext" emphasizes the fact that it may contain different header information than the "Header." The payload after the header may be omitted in some cases (e.g., ACK, RTS/CTS, etc.).

The repetition scheme expands similarly with larger values of $D_{MAX}$ and $H_{MAX}$. An exemplary aspect focuses on dealing with different values of D, with different values of H capable of being supported in a straightforward way as discussed in the paper G.hn: PHY-Frame Header Extension.

On exemplary aspect is directed toward receiver detection of D with variable repetition. More specifically, in accordance with this exemplary embodiment, the transmitter selects (or determines), the at least one D value. The selection may be at its own discretion, or may be based on information communicated between one or more receivers, or based on instruction(s) from one or more other receivers and/or a domain master. Selection may depend on the number of available sub-carriers (or the bandwidth) of the bandplan the transmitter operates on and/or the receiver(s) operates on. In accordance with this exemplary embodiment, a receiving node in the domain should be able to decode packets sent by the transmitter without knowing D a priori (i.e. prior to decoding the packet header).

Another exemplary aspect is for a transmitter to carry, insert or otherwise communicate the value of D in the header so that all nodes know how many OFDM symbols are carrying header information. The receiver(s) starts processing the header by decoding one OFDM header symbol. If the receiver decodes it successfully, then the receiver knows how many more OFDM symbols (D−1) are carrying header information for a given frame. If the receiver fails to obtain the header information from the OFDM header symbol (i.e., the header decoding fails), then the receiver can try to decode two OFDM header symbols, and so on. The decoding of each additional OFDM header symbol provides additional diversity thereby increasing the likelihood of decoding the header information correctly.

Another exemplary aspect is directed to a fixed repetition scheme per domain. More specifically, a domain master can select (or determine) one or more fixed D values for at least one node in the domain. For example, the domain master may select one fixed value for all nodes in a domain. Selection may depend on the number of available sub-carriers (or the bandwidth) of the bandplans that the domain members operate on. The domain master may change the value of D dynamically. A node in the domain first needs to determine the D that the domain master has set (or selected/determined).

On exemplary aspect is for the domain master to carry, insert or otherwise communicate the selected value of D in the header of the MAP frame while also using this D value for the transmission of the MAP header as described above. In this case, a node will be able to determine the value of D using the methods described above. After this value is determined by a node, the node can use this value until it is changed or updated by, for example, a domain master, another transceiver, etc.

Another exemplary aspect is for the domain master to carry, insert or otherwise communicate the selected value of D in the MAP while using a fixed D for the header of the MAP frame (e.g., pre-defined per medium or $D_{MAX}$). The D value in the MAP will be used for non-MAP frames/packets. In this case, a node in the domain may not need multiple levels of header decode process as described in above. Also in this exemplary method, the MAP may be sent with a different D value than the D value used for other (non-MAP) frames/packets.

Another exemplary aspect is directed toward a fixed repetition scheme per TXOP.

More specifically, in addition, or alternatively, the domain master may select (or determine) a D value per TXOP. This selection may be at its own discretion, or based on information communicated between one or more transceivers or receivers, or based on instruction from one or more transceivers or receivers. Selection may depend on the number of available sub-carriers (and/or the bandwidth) of the bandplan the transmitter/transceiver operates on and/or the receiver(s) operates on.

An exemplary technique is to include D in the TXOP descriptor transmitted in the MAP so that all nodes know in advance what value of D is used for that TXOP. The TXOP descriptor is the part of the MAP message which can be communicated via the MAP frame as discussed above.

Any of the above aspects and further aspects may be located in a network management system or network operation device that is located inside or outside the network and/or the transceiver(s). The network operation or management device that is located inside or outside the network may be managed and/or operated by a user, consumer, service provider or power utility provider, a governmental entity, or the like.

BRIEF DESCRIPTION ON THE DRAWINGS

The exemplary embodiments of the invention will be described in detail, with reference to the following figures, wherein.

DETAILED DESCRIPTION

Figure 1:
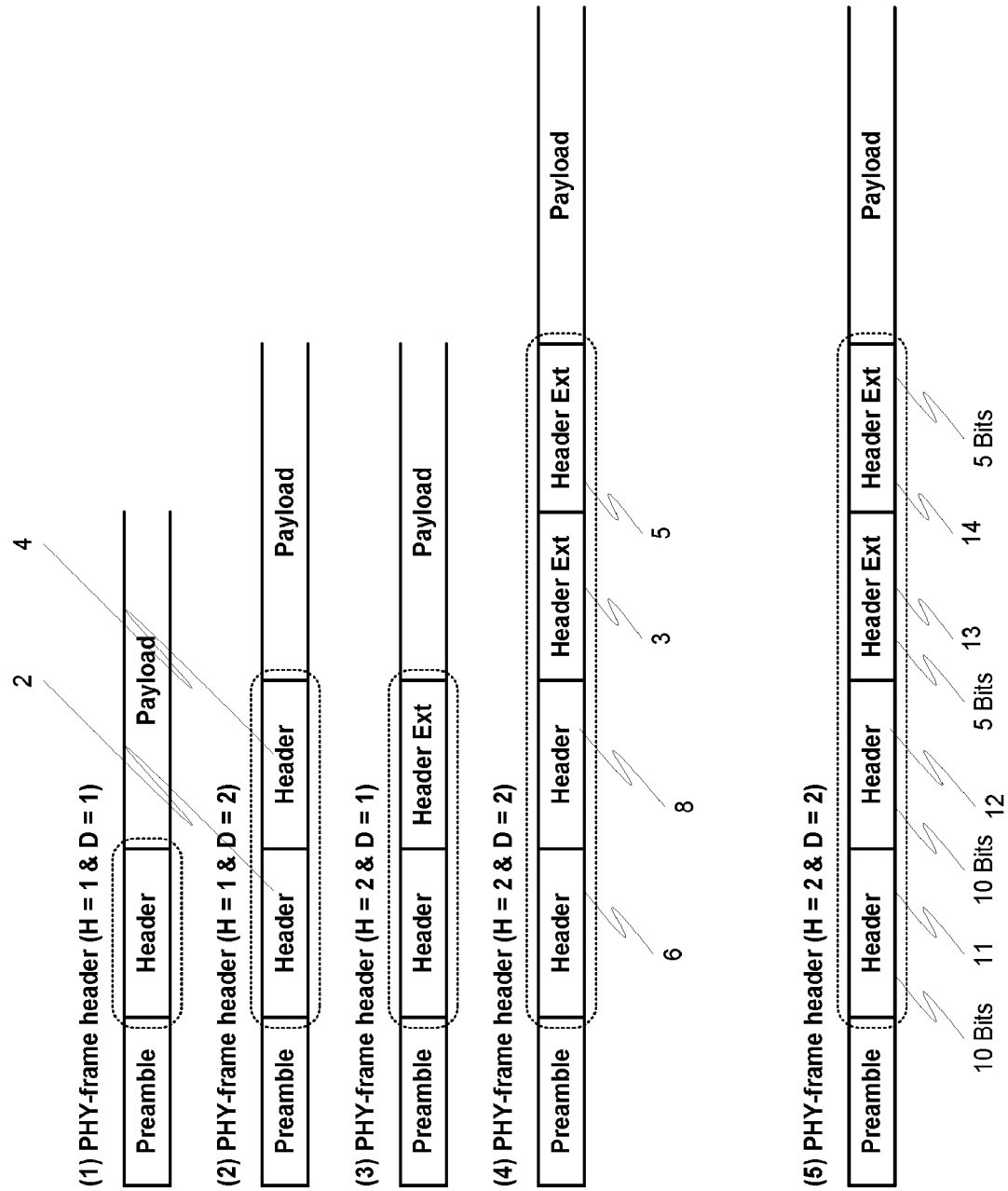
FIG. 1 illustrates exemplary header repetition schemes.

The exemplary embodiments of this invention will be described in relation to communications systems, as well as protocols, techniques and methods for header repetition, such as in a DSL or multimode multicarrier communications environment, a home network or an access network, or in general any communications network operating using any communications protocol(s). Examples of such home or access networks include home powerline networks, access powerline networks, home coaxial cable network, access coaxial cable network, wireless home networks, wireless corporate networks, home telephone networks and access telephone networks. However, it should be appreciated that in general, the systems, methods, and techniques of this invention will work equally well for other types of communications environments, networks, and/or protocols.

The exemplary systems and methods of this invention will also be described in relation to wired or wireless modems and/or a software and/or a hardware testing module, a telecommunications test device, or the like, such as a DSL modem, an ADSL modem, and xDSL modem, a VDSL modem, a line card, a G.hn transceiver, a MOCA transceiver, a Homeplug® transceiver, a power line modem, a wired or wireless modem, test equipment, a multicarrier transceiver, a wireless wide/local area network system, a satellite communications system, a network-based communications systems, such as an IP, Ethernet or ATM system, a modem equipped with diagnostic capabilities, or the like, or a separate programmed general purpose computer having a communications device that is capable of operating in conjunction with any one or more of the following communications protocols: MOCA, Homeplug, IEEE 802.11, IEEE 802.3, IEEE 802.16 (WiMAX), and ITU G.9960 (G.hn), or the like. However, to avoid unnecessarily obscuring the present invention, the following description omits well-known structures, operations and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein. Furthermore, while the exemplary embodiments illustrated herein show various components of this system collocated, it is to be appreciated that the various components of the system can be located at distant portions of a distributed network, such as a communications network, node, within a Domain Master, and/or the internet, or within a dedicated secured, unsecured, and/or encrypted system and/or within a network operation or management device that is located inside or outside the network. As an example, a Domain Master can also be used to refer to any device, system or module that manages and/or configures any one or more aspects of the network or communications environment.

Thus, it should be appreciated that the components of the system can be combined into one or more devices, or split between devices, such as a modem, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, or some combination thereof. Similarly, one or more of the functional portions of the system could be distributed between a modem and an associated computing device/system, and/or in a dedicated test and/or measurement device.

Furthermore, it should be appreciated that the various links 5, including the communications channel(s) connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol. The terms transceiver and modem are also used interchangeably herein. The terms transmitting modem and transmitting transceiver as well as receiving modem and receiving transceiver are also used interchangeably herein.

The term management interface is related to any type of interface between a management entity and/or technician and/or user and a transceiver, such as, a CO-MIB or CPE-MIB as described, for example, in ITU standard G.997.1, which is incorporated herein by reference in its entirety.

Moreover, while some of the exemplary embodiments described herein are directed toward a transmitter portion of a transceiver performing certain functions, this disclosure is intended to include corresponding receiver-side functionality in both the same transceiver and/or another transceiver, and vice versa.

FIG. 1 illustrates four different header configurations where D, H, =1 or 2. Even more specifically, in the first example, H=1 and D=1 with a preamble followed by a header followed by a payload. In a second example H=1 and D=2, with the preamble followed by header 2 that is repeated as header 4, which is followed by the payload. As discussed, the repeated header can be repeated in full or in part. In the third example, H=2 and D=1, such that the preamble is followed by a header which is followed by an extended header and the payload. In the fourth example, H=2 and D=2 such that header 6 is repeated as header 8, and the extended header 3 is repeated as extended header 5, which is followed by the payload. As discussed, the repeated portions may be exact duplicates.

As a more specific example, consider the header configuration in the fifth example. In the fifth example, H is again equal to 2 and D is equal to 2 such that header 11 is repeated as header 12, and the extended header 13 is repeated as extended header 14, which is followed by the payload. For this example, the "Header" is limited to a certain number of bits (here arbitrarily illustrated as 10 bits), however, for this example, there are 15 bits of information that need to be included in the header. Thus, 10 bits are included in the "Header" and the remaining 5 bits are included in the "Header Ext." As will be appreciated, the number of information bits to be included in the header, the number of bits the header is capable of carrying and the number of bits the header extended is capable of carrying can be any value(s). The 10 bits in "Header" 11 are repeated in "Header" 12 and the 5 bits in "Header Ext" 13 and repeated in "Header Ext" 14.

Figure 2:
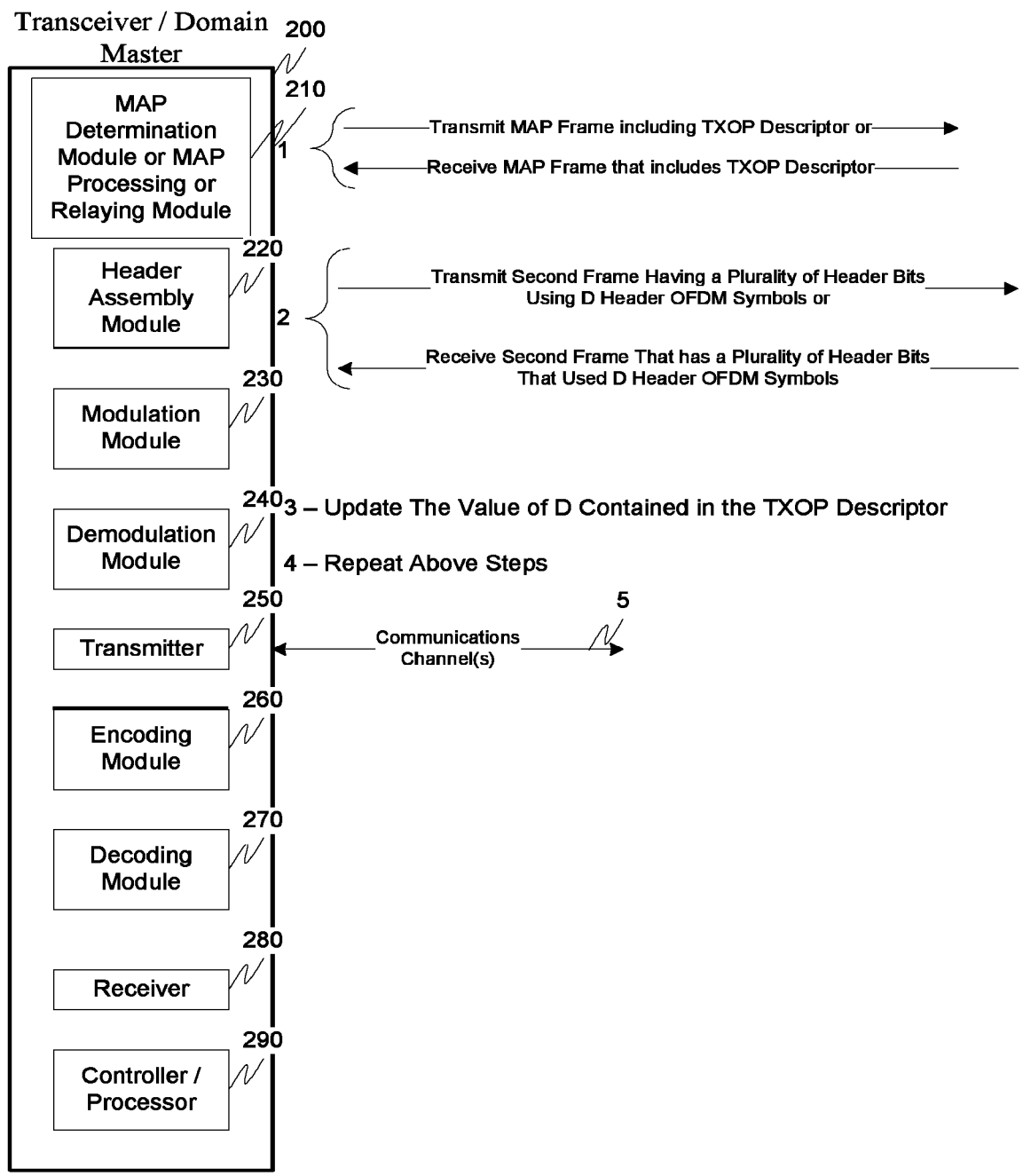
FIG. 2 illustrates an exemplary transceiver.

FIG. 2 illustrates an exemplary transceiver or Domain Master 200. In addition to well known componentry, the transceiver or Domain Master 200 includes (for a Domain Master) a MAP determination module 210 and (for a transceiver) a MAP processing or relaying module 210, a header assembly module 220, modulation module 230, demodulation module 240, transmitter 250, encoding module 260, decoding module 270, receiver 280, and controller/processor 290. In general, a Domain Master generally determines a MAP frame for transmission to one or more other transceivers while a transceiver is capable of one or more of receiving and/or relaying the received MAP frame to one or more other transceivers. For ease of discussion, in the following description, the determining and transmitting of a MAP frame will be performed by a Domain Master-type of transceiver and the receiving and/or relaying of a MAP frame will be performed by a non-domain master type of transceiver. However, the description also allows and enables any transceiver (Domain master or non-domain master) to determine, transmit, receiver and/or relay MAP messages.

In operation, the transceiver or Domain Master 200, cooperating with the MAP determination module or MAP processing or relaying module 210, transmitter 250, and controller/processor 290 transmits a MAP frame that includes a TXOP descriptor. As discussed, this TXOP descriptor contains a bit field that indicates a value for an integer (D) where the integer D indicates a number of header OFDM symbols that carry header bits. Next, the transceiver or Domain Master 200, cooperating with the header assembly module 220 and transmitter 250 prepares to transmit a second frame having a plurality of header bits using the D header OFDM symbols. Each OFDM symbol carries the plurality of header bits. Then, in cooperation with the modulation module 230, the transceiver or Domain Master 200 modulates the header bit onto the D OFDM symbols. As discussed, this modulation of the header bits onto the D OFDM symbols can occur where the header bits are modulated onto the D OFDM symbols in the same order or can occur where the header bits are modulated onto the D OFDM symbols in a different order. In addition, the encoding module 260 may encode the value of D into a bit field on the header of the second frame. The second frame is then transmitted over the communications channel.

As discussed, the value of D can be updated based, for example, on information received from another transceiver, on information received from a domain master, can be initiated by the controller/processor 290, or can in general be initiated and/or requested by any other device, wherein the value of D that is updated is different than the previous value of D. With the updated value of D, the above-described steps can be repeated utilizing this updated value of D.

In accordance with another exemplary operational embodiment, the transceiver or Domain Master 200 transmits a MAP frame that includes the TXOP descriptor and then receives a second frame that has a plurality of header bits that use the D header OFDM symbols. This is followed by the demodulation module 240 demodulating the header bits from the D OFDM symbols that were received. Additionally, the decoding module 270 may decode the value of D from a bit field in the header of the received second frame. As with the previous embodiment, the value of D can be updated with the above steps being repeated.

In accordance with yet another exemplary operational embodiment, the transceiver 200 first receives the MAP frame that includes the TXOP descriptor with the cooperation of the receiver 280. The transceiver 200, with the cooperation of the header assembly module 220, and transmitter 250, transmits a second frame having a plurality of header bits using the D header OFDM symbols. As with the previous embodiments, the header bits are modulated onto the D OFDM symbols either the same or in a different order, and the value of D may be encoded in a bit field in the header of the second frame. Again, this can be followed by an updated value of D with the above steps being repeated.

In yet another exemplary operational embodiment, the transceiver 200 receives a MAP frame that includes the TXOP descriptor, which is followed by the receipt of a second frame that has a plurality of header bits that used the D header OFDM symbols. As with one of the above exemplary embodiments, this is done with the cooperation of the receiver 280, the demodulation module 240 and decoding module 270. Upon receipt, the header bits from the D OFDM symbols can be demodulated and the value of D from a bit field in the header of the second frame may be decoded.

Figure 3:
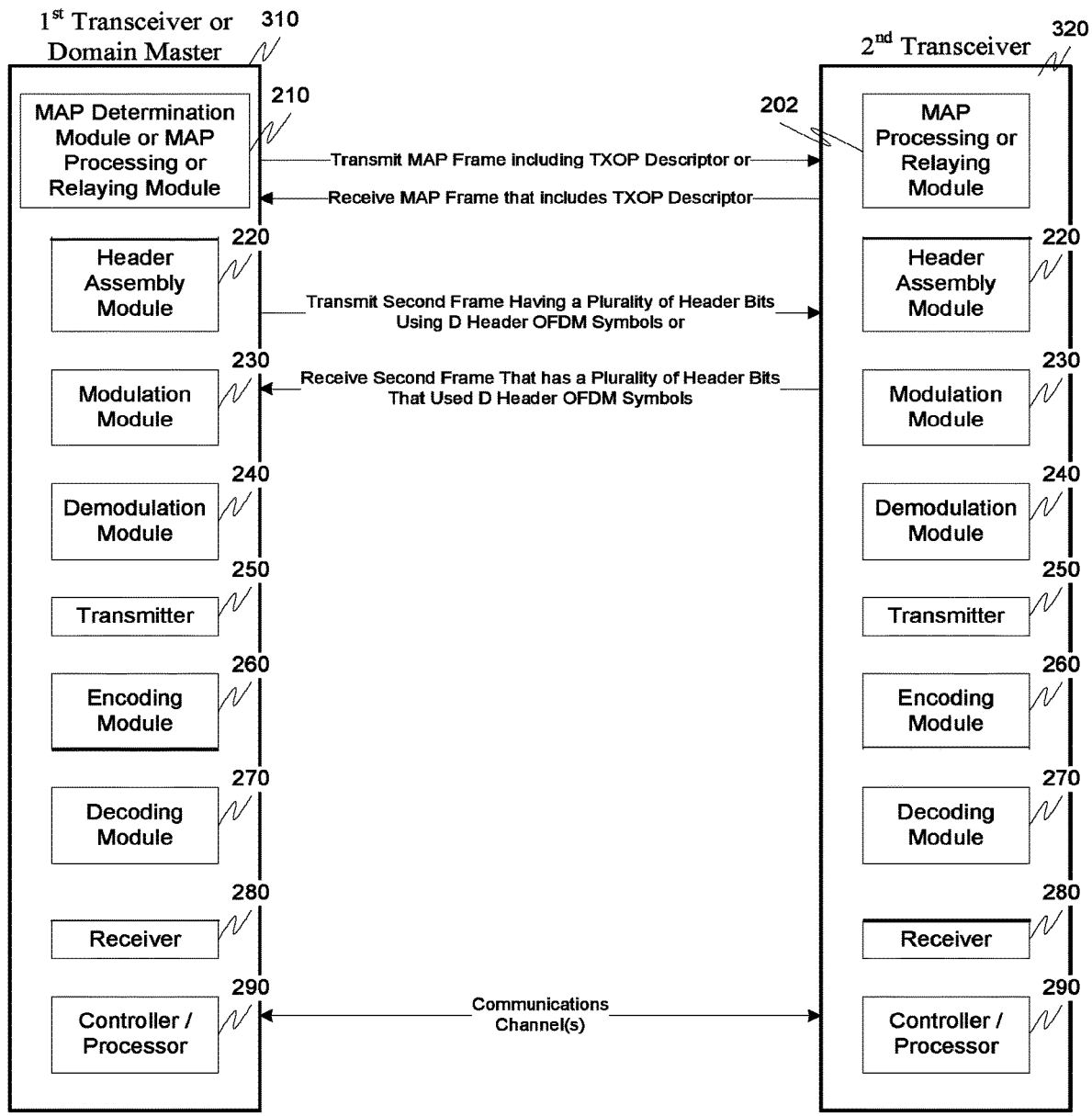
FIG. 3 illustrates an exemplary communications environment.

FIG. 3 illustrates an exemplary communications environment that includes a first transceiver or domain master 310 and a second transceiver 320. While not illustrated in FIG. 3, there could be one or more additional transceivers that act as relays to pass the various informational messages and data exchanged between the transceivers to thereby facilitate communication between the first transceiver or domain master 310 and the second transceiver 320.

In operation, the transceiver and/or domain master 310, cooperating with the MAP determination module or MAP processing or relaying module 210, transmitter 250, and controller/processor 290 transmits a MAP frame that includes a TXOP descriptor over the communications channel to the second transceiver 320. As discussed, this TXOP descriptor contains a bit field that indicates a value for an integer (D) where the integer D indicates a number of header OFDM symbols that carry header bits. Next, the transceiver/domain master 310, cooperating with the header assembly module 220 and transmitter 250 prepares to transmit a second frame to transceiver 320 having a plurality of header bits using the D header OFDM symbols. Each OFDM symbol carries the plurality of header bits. Then, in cooperation with the modulation module 230, the transceiver/domain master 310 modulates the header bit onto the D OFDM symbols. As discussed, this modulation of the header bits onto the D OFDM symbols can occur where the header bits are modulated onto the D OFDM symbols in the same order or can occur where the header bits are modulated onto the D OFDM symbols in a different order. In addition, the encoding module 260 may encode the value of D into a bit field on the header of the second frame. The second frame is then transmitted over the communications channel to the second transceiver 320.

As discussed, the value of D can be updated based, for example, on information received from another transceiver, on information received from a domain master, can be initiated by the controller/processor 290, or can in general be initiated and/or requested by any other device, wherein the value of D that is updated is different than a previous value of D. With the updated value of D, the above-described steps can be repeated utilizing this updated value of D.

In accordance with another exemplary operational embodiment, the transceiver/domain master 310 transmits a MAP frame that includes the TXOP descriptor to the second transceiver 320 and then receives from the second transceiver 320 a second frame that has a plurality of header bits that use the D header OFDM symbols. This is followed by the transceiver/domain master's 310 demodulation module 240 demodulating the header bits from the D OFDM symbols that were received. Additionally, the decoding module 270 of the transceiver/domain master 310 decodes the value of D from the bit in the header of the received second frame. As with the previous embodiment, the value of D can be updated with the above steps being repeated.

In accordance with yet another exemplary operational embodiment, the transceiver/domain master 310 first receives the MAP frame that includes the TXOP descriptor from the second transceiver 320 with the cooperation of the receiver 280 in the transceiver/domain master 310. The transceiver/domain master 310, with the cooperation of the header assembly module 220, and transmitter 250, transmits a second frame having a plurality of header bits using the D header OFDM symbols to the second transceiver 320. As with the previous embodiments, the header bits are modulated onto the D OFDM symbols either the same or in a different order, and the value of D encoded in a bit field in the header of the second frame. Again, this can be followed by an updated value of D with the above steps being repeated.

In yet another exemplary operational embodiment, the transceiver/domain master 310 receives a MAP frame from the transceiver 320 that includes the TXOP descriptor, which is followed by the receipt of a second frame that has a plurality of header bits that used the D header OFDM symbols. As with one of the above embodiments, this is done with the cooperation of the receiver 280, the demodulation module 240 and decoding module 270. Upon receipt, the header bits from the D OFDM symbols can be demodulated and the value of D from a bit field in the header of the second frame decoded. Again, this can be followed by an updated value of D with the above steps being repeated.

Figure 4:
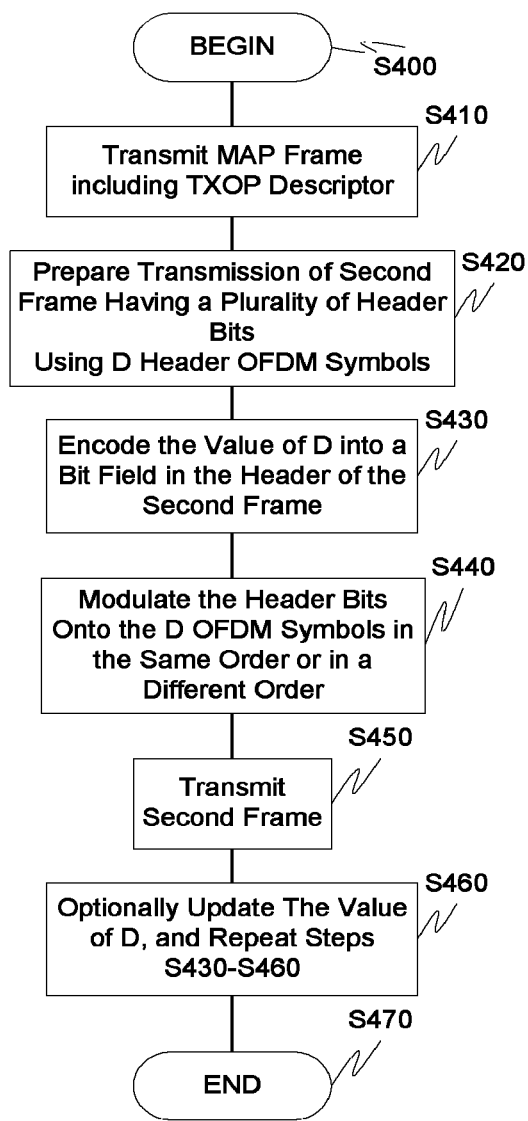
FIG. 4 is a flowchart outlining an exemplary method of a header repetition scheme.

FIG. 4 illustrates an exemplary method of packet transmission. In particular, control begins in step S400 and continues to step S410. In step S410, a MAP frame is transmitted, with the MAP frame including a TXOP descriptor. As discussed, the TXOP descriptor can contain a bit field that indicates a value for an integer (D) wherein the integer D indicates a number of header OFDM symbols that carry header bits. The TXOP descriptor could contain multiple bit fields that indicate more than a value for the integer D as well. Next, in step S420, a second frame is prepared for transmission, the second frame having a plurality of header bits using D header OFDM symbols. Then, in step S430, the value of D is encoded into a bit field in the header of the second frame. Control then continues to step S440.

In step S440, the header bits are modulated onto the D OFDM symbols in either the same order or in a different order. Then, in step S450, the second frame is transmitted with control continuing to step S460.

In step S460, the value of D can optionally be updated with steps S410-S450 being repeated. Control then continues to step S470 where the control sequence ends.

Figure 5:
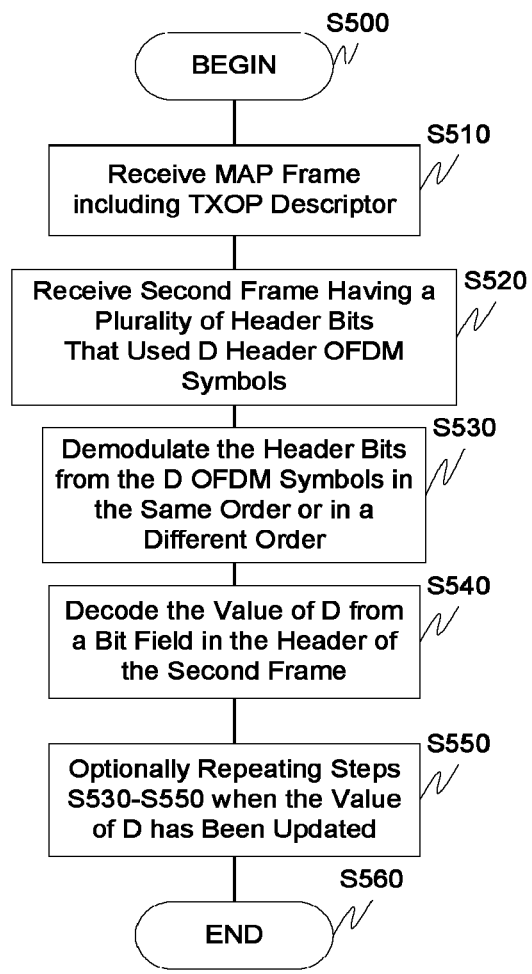
FIG. 5 is a flowchart outlining another exemplary method for a header repetition scheme.

FIG. 5 illustrates an exemplary method of packet reception. In particular, control begins in step S500 and continues to step S510. In step S510, a MAP frame is received, with the MAP frame including a TXOP descriptor. As discussed, the TXOP descriptor contains a bit field that indicates a value for an integer (D) wherein the integer D indicates a number of header OFDM symbols that carry header bits. Next, in step S520, a second frame is received, the second frame having a plurality of header bits that used the D header OFDM symbols. Then, in step S530, the header bits are demodulated from the D OFDM symbols in the same order or in a different order. Control then continues to step S540.

In step S540, the value of D is decoded from a bit field in the header of the second frame. Then, in step S550, the value of D can optionally be updated with steps S510-S540 being repeated. Control then continues to step S560 where the control sequence ends.

Figure 6:
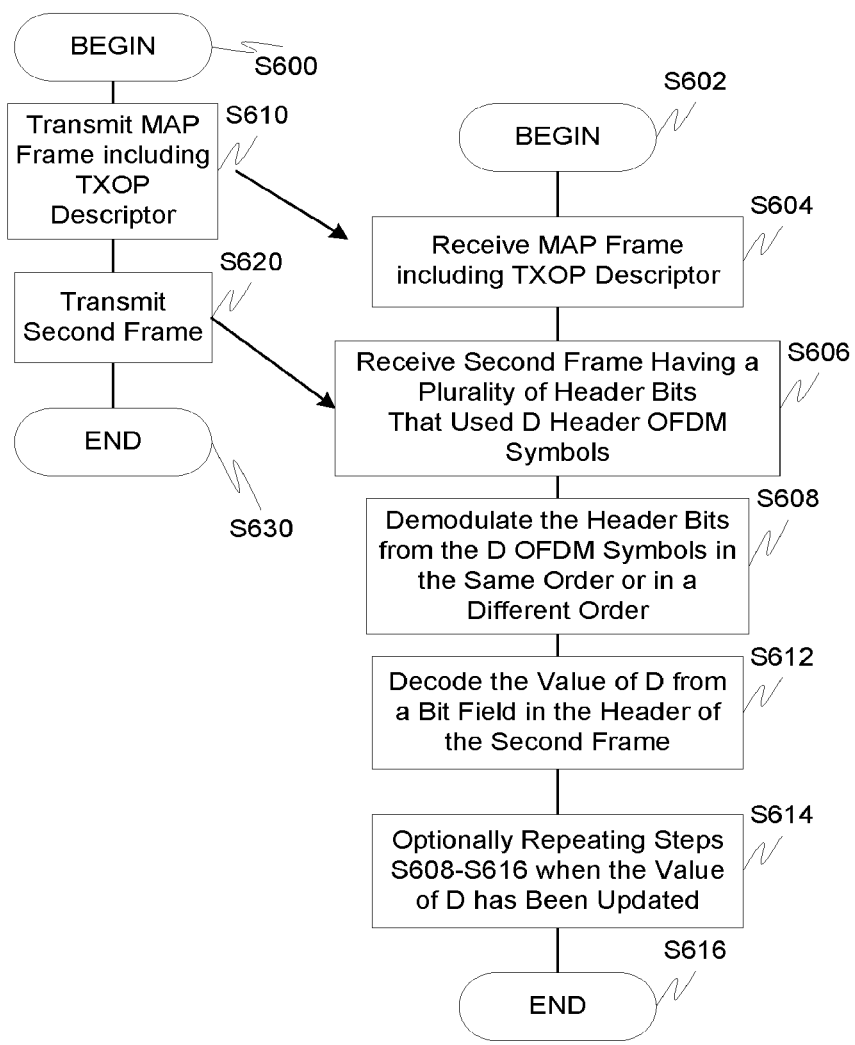
FIG. 6 is a flowchart outlining yet another exemplary method for a header repetition scheme.

FIG. 6 illustrates an exemplary method of packet communication. In particular, control begins in step S600 in a first transceiver or Domain Master and continues to step S610. In step S610, a MAP frame is transmitted to a second transceiver, with the MAP frame including a TXOP descriptor. For the second transceiver, control begins in step S602 and continues to step S604 where the MAP frame including the TXOP descriptor is received.

Next, in step S620, a second frame is prepared for transmission and transmitted to the second transceiver, the second frame having a plurality of header bits using D header OFDM symbols. As discussed the header bits are modulated onto the D OFDM symbols with the TXOP descriptor containing a bit field that indicates a value for a integer (D) wherein the integer D indicates a number of header OFDM symbols that carry header bits. The TXOP descriptor could contain multiple bit fields that indicate more than a value for the integer D as well. Additionally, the header bits can be modulated onto the D OFDM symbols in the same order or in a different order and the value of D encoded into a bit field in the header of the second frame. Control for the first transceiver then continues to step S630 where the control sequence ends.

In step S606, the second frame is received, the second frame having the plurality of header bits that used the D header OFDM symbols. Then, in step S608, the header bits are demodulated from the D OFDM symbols in the same order or in a different order with control continuing to step S612.

In step S612, the value of D is decoded from the bit field in the header of the second frame. Then, in step S612, the value of D can optionally be updated with steps S610, S620 and S604-S612 being repeated. Control then continues to step S616 where the control sequence ends.

Figure 7:
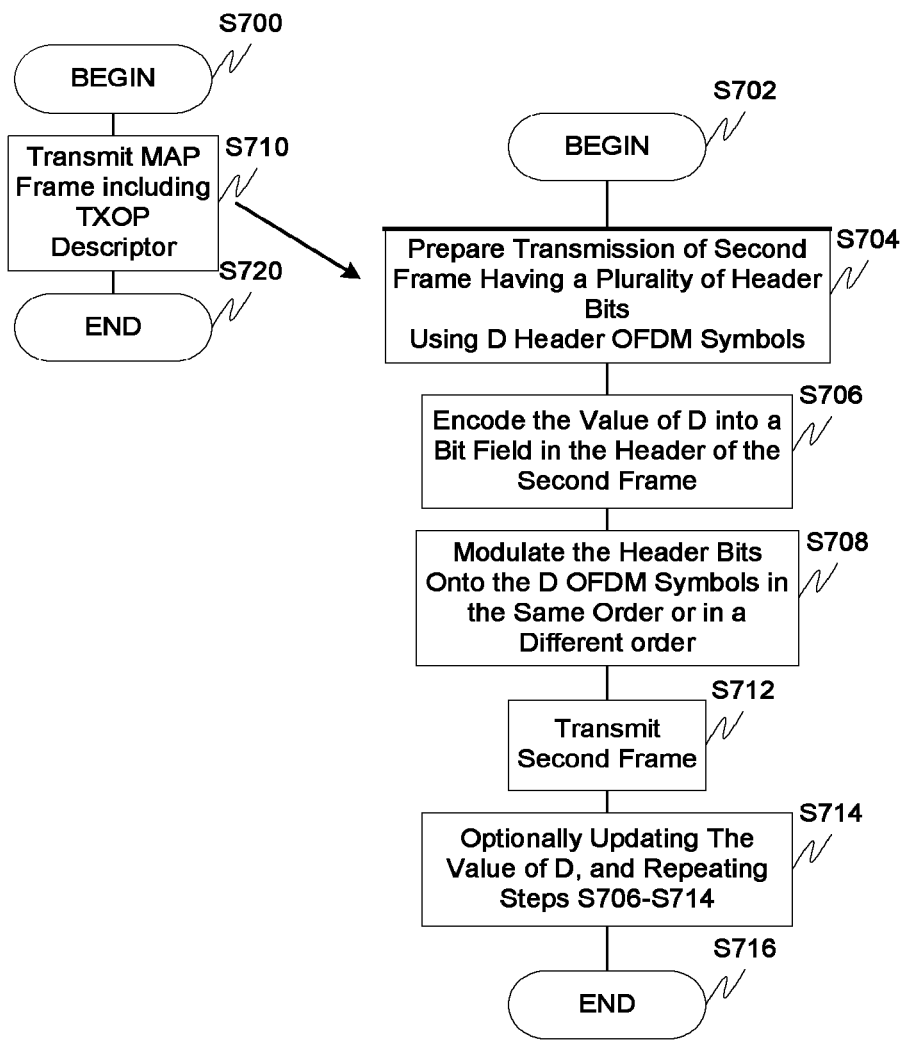
FIG. 7 is a flowchart outlining another exemplary method for a header repetition scheme.

FIG. 7 illustrates an exemplary method of packet communication. In particular, control begins in step S700 in a first transceiver or Domain Master and continues to step S710. In step S710, a MAP frame is transmitted to a second transceiver, with the MAP frame including a TXOP descriptor. Control then continues to step S720 where the control sequence ends.

For the second transceiver, control begins in step S702 and continues to step S704 where after receipt of the MAP frame that includes the TXOP descriptor, a second frame is prepared by the second transceiver for transmission, the second frame having a plurality of header bits using D header OFDM symbols. Then, in step S706, the value of D is encoded into a bit field in the header of the second frame with control continuing to step S708.

In step S708, the header bits are modulated onto the D OFDM symbols in the same order or in a different order. Then, in step S712, the second frame is transmitted with control continuing to step S714.

In step S714, the value of D can optionally be updated with steps S710 and S704-S712 being repeated. Control then continues to step S716 where the control sequence ends.

Figure 8:
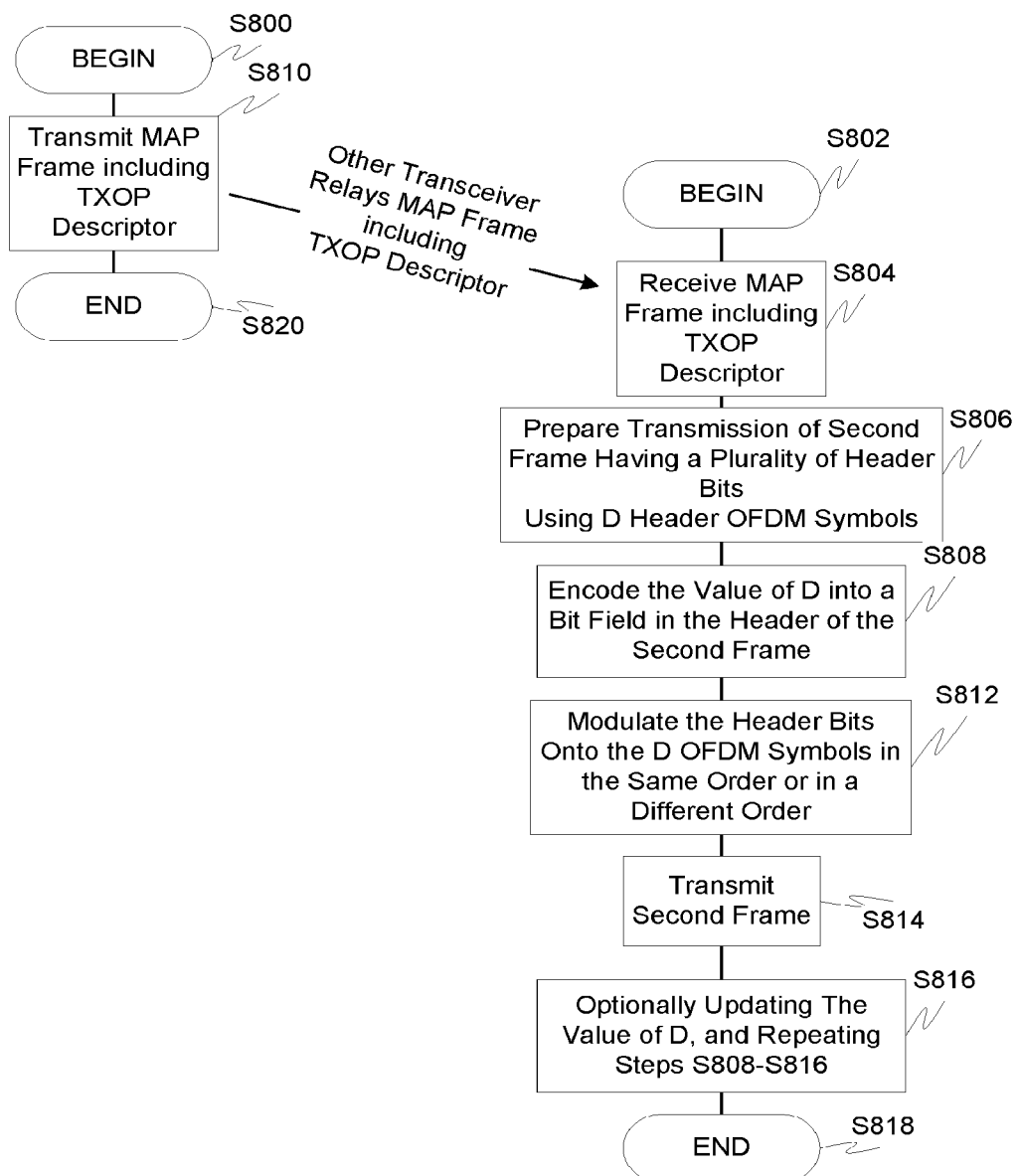
FIG. 8 is a flowchart outlining another method of an exemplary header repetition scheme.

FIG. 8 illustrates another exemplary method of packet communication. In particular, control begins in step S800 in a first transceiver or Domain Master and continues to step S810. In step S810, a MAP frame is transmitted to a second transceiver, optionally being relayed by one or more other transceivers, with the MAP frame including a TXOP descriptor. Control then continues to step S820 where the control sequence ends. The relaying of one or more of the MAP frame and second frame as discussed herein is not limited to this specific embodiment, but could also occur in any of the other embodiments disclosed herein.

For the second transceiver, control begins in step S802 and continues to step S804 where the MAP frame that includes the TXOP descriptor is received. Next, in step S806 a second frame is prepared by the second transceiver for transmission, the second frame having a plurality of header bits using D header OFDM symbols. Then, in step S808, the value of D is encoded into a bit field in the header of the second frame with control continuing to step S812.

In step S812, the header bits are modulated onto the D OFDM symbols in the same order or in a different order. Then, in step S814, the second frame is transmitted with control continuing to step S816.

In step S816, the value of D can optionally be updated with steps S810 and S804-S814 being repeated using the updated value of D. Control then continues to step S818 where the control sequence ends.

As used herein the terms network and domain have the same meaning and are used interchangeably. Also, the terms receiver, receiving node and receiving transceiver have the same meaning and are used interchangeably. Similarly, the terms transmitter, transmitting node and transmitting transceiver have the same meaning and are used interchangeably. The terms transceiver and modem also have the same meaning and are used interchangeably. While the term home network has been used in this description, the description is not limited to home networks but in fact applies also to any network, such as enterprise networks, business networks, or any network with a plurality of connected nodes. The terms transceiver, node and modem have the same meaning and are used interchangeably in the description. The term frame and packet have the same meaning and are used interchangeably in the description. The term header and PHY-frame header have the same meaning and are used interchangeably in the description.

The terms network and home network have the same meaning and are used interchangeably in the description. While the term Home network has been used in this description, the description is not limited to home networks but in fact applies also to any network, such as enterprise networks, business networks, or any network with a plurality of connected nodes.

While the above-described methods and systems can be described with respect to a port (or endpoint) in a network, they can also be implemented in a dedicated module such as a test or network optimization module. This dedicated module could be plugged into the network and act as a Domain Master or with the cooperation of the Domain Master could initiate the various measurement techniques, gather the measurements from the port(s) in the network, analyze the measurements and use the measured information to detect and diagnose problems in the network and/or to optimize or improve the performance of a network.

While the above-described flowcharts have been discussed in relation to a particular sequence of events, it should be appreciated that one or more changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable. Moreover, the steps in the flowcharts are optional, with some of or all of the steps being performed.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device (or one or more equivalent means) capable of implementing a state machine that is in turn capable of implementing the methodology illustrated herein can be used to implement the various communication/measurement methods, protocols and techniques according to this invention.

Furthermore, the disclosed methods may be readily implemented in software stored on a non-transitory computer-readable storage media using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable storage medium, executed on programmed general-purpose computer with the cooperation of a controller and memory, a special purpose computer, a microprocessor, or the like. The systems and methods of this invention can be implemented as a program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a test/modem device.

While the invention is described in terms of exemplary embodiments, it should be appreciated that any of the aspects of the invention described herein in connection with the exemplary embodiments could be separately and individually claimed and one or more of the features of the various embodiments can be combined with one or more features discussed in relation to one or more other embodiments.

While the exemplary embodiments illustrated herein discuss the various components collocated, it is to be appreciated that the various components of the system can be located a distant portions of a distributed network, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for header repetition in OFDM systems. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:
1. A wireless communication device, comprising:
a modulator configured to modulate a wireless packet to be transmitted; and
a wireless transmitter configured to transmit the wireless packet through a communication channel,
wherein formats of the wireless packet includes a first packet format and a second packet format, the first packet format comprises a first header field carried by a first orthogonal frequency division multiplexing (OFDM) symbol, the second packet format comprises both the first header field carried by the first OFDM symbol and a second header field carried by a second OFDM symbol which follows the first OFDM symbol, and the second header field is a repetition of the first header field, and wherein the wireless communication device is configured to transmit the wireless packet in a format determined among the first packet format and the second packet format.

2. The wireless communication device of claim 1, wherein when the wireless packet is transmitted in the first packet format, the wireless communication device transmits the first header field without transmitting the second header field which repeats the first header field.

3. The wireless communication device of claim 1, wherein when the wireless packet is transmitted in the second packet format, the wireless communication device transmits both the first header field and the second header field which repeats the first header field.

4. The wireless communication device of claim 1, wherein the first and second header fields contain information for decoding the wireless packet.

5. The wireless communication device of claim 1, wherein the first and second header fields contain information related to a length of the wireless packet.

6. A wireless communication method, comprising:
modulating a wireless packet to be transmitted; and
transmitting the wireless packet through a communication channel,
wherein formats of the wireless packet includes a first packet format and a second packet format, the first packet format comprises a first header field carried by a first orthogonal frequency division multiplexing (OFDM) symbol, the second packet format comprises both the first header field carried by the first OFDM symbol and a second header field carried by a second OFDM symbol which follows the first OFDM symbol, and the second header field is a repetition of the first header field, and wherein the wireless packet is configured to be transmitted in a format determined among the first packet format and the second packet format.

7. The wireless communication method of claim 6, wherein when the wireless packet is transmitted in the first packet format, the wireless packet comprises the first header field without comprising the second header field which repeats the first header field.

8. The wireless communication method of claim 6, wherein when the wireless packet is transmitted in the second packet format, the wireless packet comprises both the first header field and the second header field which repeats the first header field.

9. The wireless communication method of claim 6, wherein the first and second header fields contain information for decoding the wireless packet.

10. The wireless communication method of claim 6, wherein the first and second header fields contain information related to a length of the wireless packet.

* * * * *